United States Patent
King

(10) Patent No.: US 7,098,641 B2
(45) Date of Patent: *Aug. 29, 2006

(54) ADAPTIVE DIGITAL VOLTAGE REGULATOR

(75) Inventor: Paul Frederic King, Celebration, FL (US)

(73) Assignee: Kiawe Forest, LLC, Incline Village, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/180,399

(22) Filed: Jul. 12, 2005

(65) Prior Publication Data

US 2006/0119336 A1  Jun. 8, 2006

Related U.S. Application Data

(63) Continuation-in-part of application No. 11/008,481, filed on Dec. 8, 2004, now Pat. No. 6,992,469.

(51) Int. Cl.
G05F 1/46 (2006.01)

(52) U.S. Cl. ........................... 323/283; 323/285

(58) Field of Classification Search ................ 323/282, 323/283, 285, 351
See application file for complete search history.

(56) References Cited

U.S. PATENT DOCUMENTS 5,594,324 A * 1/1997 Canter et al. ............... 323/282
6,841,979 B1 * 1/2005 Berson et al. ............... 323/282
RE38,780 E  * 8/2005 Hawkes et al. ............. 323/282
6,992,469 B1 * 1/2006 King ........................... 323/283

* cited by examiner

Primary Examiner—Adolf Berhane

(57) ABSTRACT

A digitally-controlled, DC/DC converter includes at least one switched-mode power stage for the purpose of converting an input voltage (Vin) into an output voltage (Vout); the power stage including at least one controllable switching device, which is turned ON and OFF by a control device with temporal resolution $\Delta t$. The converter further includes a duty cycle control mechanism for controlling the duty cycle of the controllable switching device, the duty cycle control mechanism including a mechanism for estimating the output voltage error; a mechanism for estimating the target duty cycle; a duty cycle quantization mechanism for determining, for a target duty cycle estimate, a first set of quantized ON time/OFF time pairs suitable for controlling the switching device; and a selector mechanism for determining the turn ON and turn OFF times of said controllable switching device by choosing, cycle by cycle, an ON time/OFF time pair from a second set of quantized ON time/OFF time pairs, derived from said first set, choosing in such a manner that the amplitude of the output voltage error is continually minimized. To compensate for the load-dependent effects of parasitics, the second set of quantized ON time/OFF time pairs is adjusted continuously, to insure optimum performance at all load levels.

31 Claims, 6 Drawing Sheets

FIG 6

| DT | DQmin ON | DQmin OFF | DQmax ON | DQmax OFF |
|---|---|---|---|---|
| 1 | 0 | 16 | 1 | 16 |
| 2 | 0 | 16 | 1 | 16 |
| 3 | 0 | 16 | 1 | 16 |
| ••• | ••• | ••• | ••• | ••• |
| 55 | 6 | 9 | 7 | 8 |
| 56 | 6 | 9 | 7 | 8 |
| 57 | 7 | 10 | 8 | 9 |
| 58 | 7 | 9 | 8 | 8 |
| 59 | 7 | 10 | 8 | 8 |
| 60 | 7 | 9 | 8 | 8 |
| 61 | 7 | 9 | 8 | 7 |
| 62 | 7 | 9 | 8 | 7 |
| 63 | 7 | 9 | 8 | 7 |
| 64 | 8 | 8 | 9 | 7 |
| 65 | 8 | 9 | 9 | 7 |
| 66 | 8 | 9 | 9 | 7 |
| 67 | 8 | 9 | 9 | 7 |
| 68 | 9 | 8 | 9 | 7 |
| 69 | 8 | 8 | 9 | 7 |
| 70 | 8 | 8 | 9 | 6 |
| 71 | 8 | 7 | 9 | 7 |
| 72 | 9 | 7 | 10 | 6 |
| 73 | 9 | 8 | 10 | 6 |
| 74 | 9 | 8 | 10 | 6 |
| 75 | 9 | 7 | 10 | 6 |
| 76 | 9 | 7 | 10 | 6 |
| ••• | ••• | ••• | ••• | ••• |
| 125 | 16 | 1 | 16 | 0 |
| 126 | 16 | 1 | 16 | 0 |
| 127 | 16 | 1 | 16 | 0 |

ADAPTIVE DIGITAL VOLTAGE REGULATOR

CROSS-REFERENCE TO RELATED APPLICATIONS

This application is a continuation-in-part application of, and claims priority under 35 U.S.C. § 120 from, U.S. patent application Ser. No. 11/008,481, entitled "Digital Voltage Regulator for DC/DC Converters," filed on Dec. 8, 2004, now U.S. Pat. No. 6,992,469, the subject matter of which is incorporated by reference herein in its entirety.

STATEMENT REGARDING FEDERALLY SPONSORED RESEARCH OR DEVELOPMENT

Not Applicable

BACKGROUND OF THE INVENTION

The invention pertains generally to the field of power conversion, and more particularly to digitally-controlled switched-mode DC/DC converters.

A broad class of switched-mode DC/DC power converters exists with the property that the ratio of the average output voltage to the input voltage is determined by the average duty cycle of a controllable switching device within the power conversion stage of the converter. Examples include buck, boost, inverting buck-boost, forward, and flyback converters, operated in the continuous conduction mode (CCM). Where the load on the power converter varies dynamically, or there is a requirement to track changes in load with minimal output voltage error, regulation of these converters is accomplished by continually estimating the output voltage error (the output voltage error being the difference between the uncorrupted output voltage and the desired output voltage) and continually adjusting the duty cycle of the switching device to compensate for changes in load conditions manifest in output voltage error estimates. In this case, the act of regulation consists of controlling, cycle by cycle, the duty cycle of the switching device in accordance with output voltage error estimates, so that the amplitude of the output voltage error is continually minimized.

Regulation mechanisms for this purpose, known as pulse width modulation (PWM) regulators, generally incorporate a pulse width control mechanism and a duty cycle control mechanism, where the former generates the ON pulse appropriate to the realization of the duty cycle generated by the latter. Duty cycle control mechanisms thus incorporate a mechanism for estimating the target duty cycle (the target duty cycle being the duty cycle essential to achieve the desired output voltage). A target duty cycle estimation mechanism is commonly a feedback mechanism, driven by the output voltage error, but it could as well be a feedforward mechanism, driven by the input voltage, or some combination of the two.

The most commonly used pulse width control mechanisms are analog in nature; that is they accept as input a continuously variable analog signal representing the desired duty cycle, and they output pulses of continuously variable width. As in other previously analog fields, continuous advances in integrated circuit technology have stimulated the application of digital techniques to the field of power conversion. As a result, the first digital PWM regulation mechanisms, replacing analog PWM regulators, have been developed and are being commercialized. It is the nature of such mechanisms that the generated pulse widths are quantized—a consequence of the temporal resolution of the digital regulation mechanism. If the temporal resolution of the regulation mechanism is $\Delta t$, then the pulse widths are constrained to be integral multiples of $\Delta t$. Furthermore, switching cycles, spanning consecutive ON and OFF pulses, are likewise constrained to be integral multiples of $\Delta t$.

One challenge to those who would apply digital PWM regulation mechanisms to power converters, especially DC/DC converters employed in battery-powered mobile applications, is the challenge of achieving acceptable application performance with digital regulation mechanisms. Quantization of pulse widths translates into quantized duty cycles, which constrain the ability of any duty cycle control mechanism to limit output voltage ripple to an arbitrary application-dictated level.

To understand the nature of this challenge, consider a DC/DC converter in a battery powered mobile application. The switching frequency is typically set in the neighborhood of 1 MHz, to minimize the size and cost of discrete components and maximize the operating efficiency of the converter. A digital PWM regulation mechanism operating at 16 MHz would thus be able to generate pulses widths of 0, $1/16$ usec, $2/16$ usec, $3/16$ usec . . . $16/16$ usec. Assuming a fixed switching frequency, 17 instantaneous duty cycles (including 0 and 1) could be applied. One method for regulating the output voltage would be to alternate between two quantized duty cycles, one smaller than the target duty cycle, and the other larger. In one embodiment of this concept (cf. U.S. Pat. No. 6,677,733), the duty cycle control mechanism examines the current output voltage error estimate, and if it is positive, selects the smaller duty cycle for the next cycle of the switching device. Similarly, if the current output voltage error estimate is negative, it selects the larger duty cycle for the next cycle of the switching device. At its best, however, this duty cycle control mechanism may not be able to limit output voltage ripple to an acceptable level . . . in which case the only obvious recourse for manufacturers of regulators is to improve the temporal resolution of the regulation mechanism . . . i.e., boost the clock frequency.

Even if the ripple is tolerable under static line and load conditions, it may present a challenge to tight regulation under dynamic load conditions, owing to the difficulty in providing accurate output voltage feedback in the presence of increased (though tolerable) ripple. In this case the only obvious recourse to manufacturers of regulators to minimize ripple without penalizing dynamic performance is to boost the clock frequency.

But boosting the clock frequency to mitigate the effects of quantization on output voltage error (static and dynamic) may compromise cost and efficiency metrics. For example, the complexity and, consequently, the cost of the digital regulation mechanism are likely to increase as well as the power dissipation. Moreover, the increased cost and power dissipation will be further multiplied, if the requirement to boost the clock frequency should prevent the integration (at a substrate level) of the digital regulation mechanism with other electronic componentry.

Clearly there is a need for digital control methods that mitigate the requirement for higher clock frequencies solely for the purpose of achieving acceptable output voltage error (static and dynamic) in a broad class of DC/DC converters.

BRIEF SUMMARY OF THE INVENTION

The primary objective of this invention is to provide digital control methods that mitigate the requirement for higher clock frequencies solely for the purpose of achieving acceptable output voltage error (static and dynamic) in a broad class of DC/DC converters.

To this end, a digital duty cycle control mechanism, including a mechanism for estimating the output voltage error; a mechanism for estimating the target duty cycle, a novel duty cycle quantization mechanism for determining a first set of one or more quantized ON time/OFF time pairs for regulating the output voltage, and a novel output-voltage-error-driven selector mechanism for determining the turn ON and turn OFF times of the switching device by choosing, cycle by cycle, from a second set of two or more quantized ON time/OFF time pairs, derived from the first set, is disclosed.

The novelty of the duty cycle quantization mechanism follows from the insight that the output voltage ripple resulting from a sequence of quantized switching cycles (a cycle being the sum of consecutive ON and OFF times) decreases as the number of quantized switching cycles available to generate the sequence increases; and that the number available can be expanded by relaxing the (prior art) premise that all switching cycles be fixed in length, cycle by cycle, under nominal load conditions. If, for example, the switching cycle were allowed to shrink/stretch by the temporal resolution of the digital regulation mechanism, the number of available switching cycles increases three-fold, with the potential for comparable reductions in output voltage ripple.

The novelty of the selector mechanism follows from the insight that in a temporally quantized switching environment, the feedback mechanism controlling the switch is fundamentally limited in the amount of useful information it can provide at each cycling of the switch. For example, a digital regulation mechanism practicing conventional fixed-frequency pulse width modulation may provide as little as four bits, cycle by cycle. Under these circumstances, when it is impossible, even in the steady state, to form a pulse of the width required to drive the output voltage error precisely to zero, it is critical to be able to choose a quantized pulse appropriate to driving the error back toward zero when the error changes sign, as taught in the previously cited prior art. In other words, instantaneous output voltage error feedback must be available, even if its reliability is limited to 1 bit, to operate effectively in a temporally quantized environment.

When these insights are combined in a duty cycle quantization mechanism for determining, from an estimated target duty cycle, a first set of one or more quantized ON time/OFF time pairs for regulating the output voltage, and in a novel output-voltage-error-driven selector mechanism for determining the turn ON and turn OFF times of the switching device by choosing, cycle by cycle, from a second set of two or more quantized ON time/OFF time pairs, derived from the first set, the ripple induced by quantization as well as the delay in the feedback path are reduced. To illustrate the latter point, the choosing of ON time/OFF time pairs, instead of ON times, means that the choice can be broken into two choices: ON time and OFF time; and that feedback measured during the ON time AND during the OFF time may be applied virtually instantaneously to regulate the output voltage.

In accordance with the present invention, a method is provided for converting an input voltage to an output voltage by means of a switched-mode DC/DC converter; the input voltage being converted into an output voltage with the aid of a power stage, including at least one controllable switch, which is turned ON and turned OFF by a control device characterized in that owing to the temporal resolution of the control device ($\Delta t$), both the turn ON and turn OFF times of the controllable switching device are constrained to be integral multiples of $\Delta t$.

Central to this method is a duty cycle control mechanism for controlling the duty cycle of the controllable switching device, the duty cycle control mechanism including a mechanism for estimating the output voltage error; a mechanism for estimating the target duty cycle; a duty cycle quantization mechanism for determining, for a target duty cycle estimate, a first set of quantized ON time/OFF time pairs suitable for controlling said controllable switching device, characterized in that the quantized ON time and OFF time of each pair (in said first set) are determined independently of each other; that is, the sum of the ON time and OFF time is not fixed; and may vary, pair to pair, constrained to a set of discrete values $\{Tswi\}$ (i=1, 2, ... I) where Tswi is an integral multiple of $\Delta t$; and an output-voltage-error-driven selector mechanism for determining the turn ON and turn OFF times of said controllable switching device by choosing, cycle by cycle, an ON time/OFF time pair from a second set of quantized ON time/OFF time pairs, derived from said first set, choosing in such a manner that the amplitude of the output voltage error is continually minimized.

In accordance with the present invention, a switched-mode DC/DC converter is provided, comprising;

a power stage for the purpose of converting an input voltage into at least one output voltage, the power stage including at least one controllable switching device; and a control device for the purpose of turning ON and turning OFF the controllable switching device, characterized in that owing to the temporal resolution of the control device ($\Delta t$), both the turn ON and turn OFF times of the controllable switching device are constrained to be integral multiples of $\Delta t$; and a duty cycle control mechanism for controlling the duty cycle of said controllable switching device, comprising:

a mechanism for estimating output voltage error; and a mechanism for estimating the target duty cycle; and a duty cycle quantization mechanism for determining, for a target duty cycle estimate, a first set of at least one quantized ON time/OFF time pair suitable for controlling said controllable switching device, characterized in that the quantized ON time and OFF time of each pair (in said first set) are determined independently of each other; that is, the sum of the ON time and OFF time is not fixed; and may vary, pair to pair, constrained to a set of discrete values $\{Tswi\}$ (i=1, 2, ... I) where Tswi is an integral multiple of $\Delta t$; and an output-voltage-error-driven selector mechanism for determining the turn ON and turn OFF times of said controllable switching device by choosing, cycle by cycle, an ON time/OFF time pair from a second set of at least two quantized ON time/OFF time pairs, derived from said first set, choosing in such a manner that the amplitude of the output voltage error is continually minimized.

In a preferred embodiment, the selector mechanism determines turn ON and turn OFF times by choosing, cycle by cycle, an ON time/OFF time pair from a set of two quantized ON time/OFF time pairs, extracted from a table (of sets) indexed by the estimated target duty cycle; choosing the ON time/OFF time pair with the lower implied duty cycle when the output voltage error estimate is positive (i.e., the output voltage is higher than the desired output voltage), and the pair with the higher implied duty cycle when the output voltage error estimate is negative.

In a second preferred embodiment, the selector mechanism determines turn ON and turn OFF times by choosing, cycle by cycle, an ON time/OFF time pair from a set of three quantized ON time/OFF time pairs, generated by the selector mechanism from a quantized ON time/OFF time pair generated by the duty cycle quantization mechanism; choosing the ON time/OFF time pair with the lowest implied duty cycle when the output voltage error estimate is highest, and the pair with the highest implied duty cycle when the output voltage error estimate is lowest, and the remaining pair when the output voltage error is neither highest nor lowest.

In a third preferred embodiment, the selector mechanism determines turn ON and turn OFF times by choosing, cycle by cycle, an ON time/OFF time pair from a set of six quantized ON time/OFF time pairs, generated by the selector mechanism from a quantized ON time/OFF time pair generated by the duty cycle quantization mechanism; choosing the ON time/OFF time pair with the lowest implied duty cycle when the output voltage error estimate is highest, and the pair with the highest implied duty cycle when the output voltage error estimate is lowest, and one of the remaining intermediate pairs when the output voltage error is one of the corresponding intermediate values.

Those skilled in the art will understand that the digital duty cycle control mechanism of the present invention may be implemented in mixed signal circuitry including logic circuits and/or a microprocessor with appropriate software or firmware. Further, those skilled in the art will understand that the digital duty cycle control mechanism of the present invention may be applied to any DC/DC converter topology, including but not limited to buck, boost, inverting buck-boost, forward, and flyback converters.

The following figures and descriptions disclose other aspects and advantages of the proposed invention.

BRIEF DESCRIPTION OF THE DRAWINGS

Various aspects and features of the present invention may be understood by examining the following figures:

FIG. 6 is a table of variable-frequency duty cycle pairs indexed by the estimated target duty cycle.

DETAILED DESCRIPTION OF THE INVENTION

A broad class of switched-mode DC/DC power converters exists with the property that the ratio of the average output voltage to the input voltage is determined by the average duty cycle of a controllable switching device within the power conversion stage of the converter. Examples include buck, boost, inverting buck-boost, forward, and flyback converters, operated in the continuous conduction mode (CCM). Where the load on the power converter varies dynamically, or there is a requirement to track changes in load with minimal output voltage error, regulation of these converters is accomplished by continually estimating the output voltage error (the output voltage error being the difference between the uncorrupted output voltage and the desired output voltage) and continually adjusting the duty cycle of the switching device to compensate for changes in load conditions manifest in output voltage error estimates. In this case, the act of regulation consists of controlling, cycle by cycle, the duty cycle of the switching device in accordance with output voltage error estimates, so that the amplitude of the output voltage error is continually minimized.

Regulation mechanisms for this purpose, known as PWM regulators, generally incorporate a pulse width control mechanism and a duty cycle control mechanism, where the former generates the ON pulse appropriate to the realization of the duty cycle generated by the latter. Duty cycle control mechanisms thus incorporate a mechanism for estimating the target duty cycle (the target duty cycle being the duty cycle essential to achieve the desired output voltage). A target duty cycle estimation mechanism is commonly a feedback mechanism, driven by the output voltage error, but it could as well be a feedforward mechanism, driven by the input voltage, or it could be some combination of the two.

The most commonly used pulse width control mechanisms are analog in nature; that is they accept as input a continuously variable analog signal representing the desired duty cycle, and they output pulses of continuously variable width. As in other previously analog fields, continuous advances in integrated circuit technology have stimulated the application of digital techniques to the field of power conversion. As a result, the first digital PWM regulation mechanisms, replacing analog PWM regulators, have been developed and are being commercialized. It is the nature of such mechanisms that the generated pulse widths are quantized—a consequence of the temporal resolution of the digital regulation mechanism. If the temporal resolution of the regulation mechanism is $\Delta t$, then the pulse widths are constrained to be integral multiples of $\Delta t$. Furthermore, switching cycles, spanning consecutive ON and OFF pulses, are likewise constrained to be integral multiples of $\Delta t$.

Figure 1:
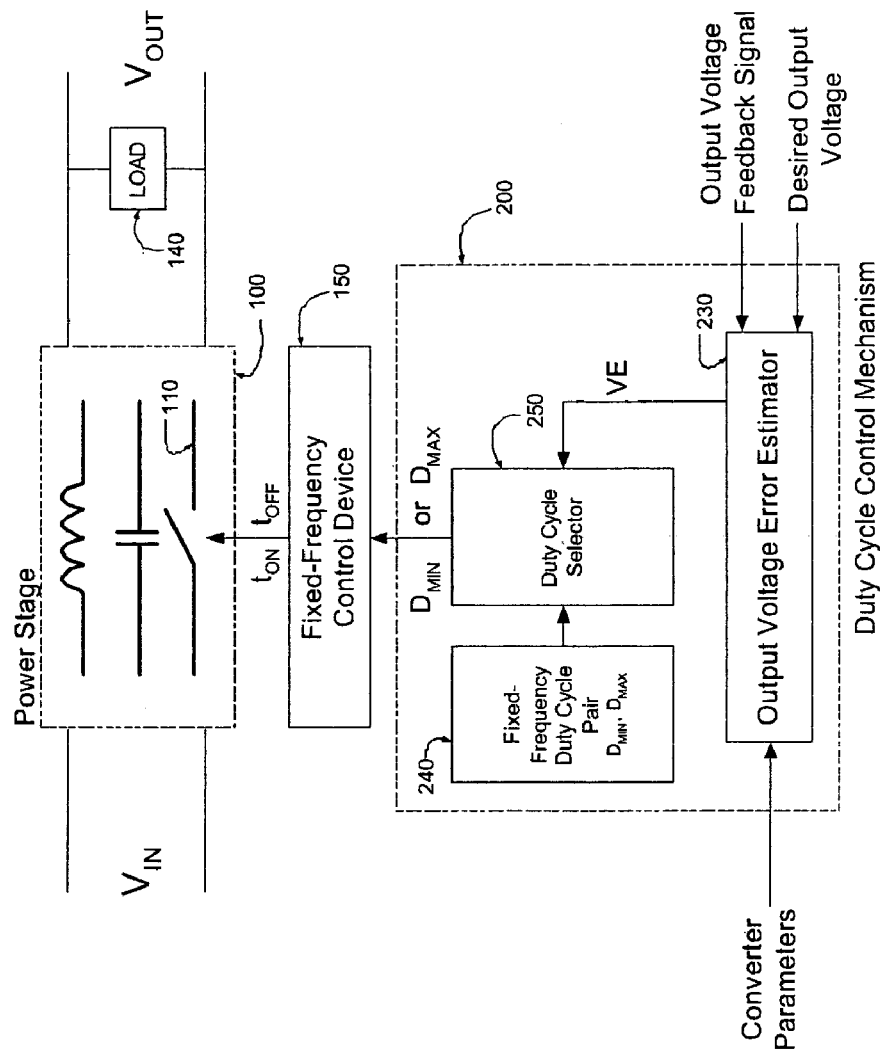
FIG. 1 is a block diagram illustrating a prior art digital duty cycle control mechanism.

FIG. 1 describes a prior art switched-mode DC/DC power converter (cf. U.S. Pat. No. 6,677,733) comprising power stage 100 for the purpose of converting input voltage Vin to output voltage Vout; fixed-frequency control device 150 for the purpose of turning ON and turning OFF the controllable switching device 110, included in power stage 100; and duty cycle control mechanism 200 for controlling the duty cycle of switching device 110.

Because control device 150 is a fixed-frequency control device, it turns ON switching device 110 at fixed intervals, Tsw. Control device 150 turns OFF switching device 110 by translating (if necessary) duty cycle input into ON time, cycle by cycle.

The duty cycle control mechanism is comprised of an output voltage error estimator 230, a mechanism for generating, from an output voltage error signal, an estimate of the uncorrupted output voltage error, and an output-voltage-error-driven duty cycle selector 250 for determining the turn ON and turn OFF times of switching device 110, in such a manner that the amplitude of the output voltage error is continually minimized.

In a digital implementation, the output voltage error estimator frequently takes the form of a digital PID (proportional-integral-differential) filter, operating on an output voltage error signal. PID filters provide the possibility of trading off delay for improved signal-to-noise ratio. Where delay must be minimized, a bi-valued output voltage error estimate derived via a binary comparator may be appropriate. Such is the nature of output voltage error estimator 230.

In duty cycle control mechanism 200, the estimate of the output voltage error is sampled by duty cycle selector 250 at the end of every switching cycle, and the value applied to select the duty cycle of the next switching cycle, thereby determining turn ON and turn OFF times of switching device 110.

Accordingly, the duty cycle selector 250 chooses, cycle by cycle, Dmin or Dmax (Dmin and Dmax having been specified to span a range of input voltage specific to the application); choosing Dmin when the output voltage error estimate is positive (i.e., the uncorrupted output voltage is higher than the desired output voltage), and Dmax when the output voltage error estimate is negative.

While the simplicity of the duty cycle control mechanism described above is appealing, the duty-cycle-quantization-induced output voltage ripple can become intolerable if the range of input voltage, and consequently the spread of Dmin and Dmax, is too wide.

Figure 2:
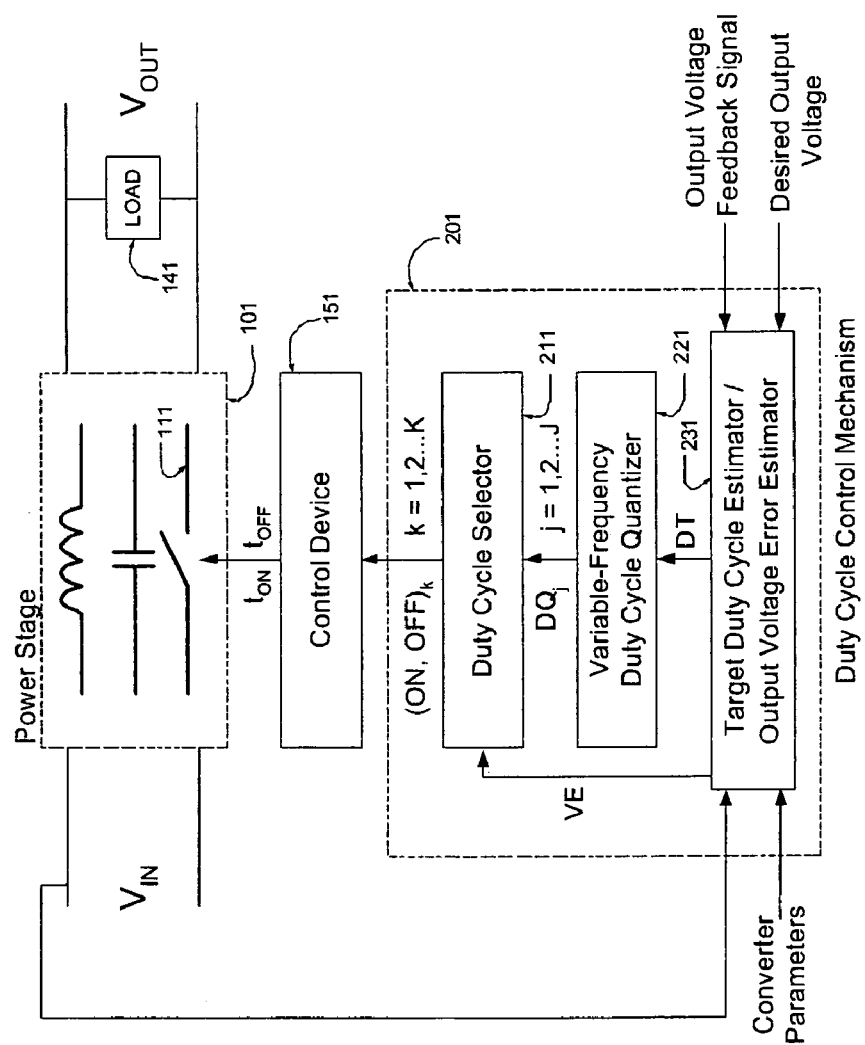
FIG. 2 is a block diagram illustrating a digital duty cycle control mechanism according to the present invention.

FIG. 2 describes a switched-mode DC/DC power converter according to the present invention, comprising power stage 101 for the purpose of converting input voltage Vin to output voltage Vout; control device 151 for the purpose of turning ON and turning OFF the controllable switching device 112, included in power stage 101; and duty cycle control mechanism 201 for controlling the duty cycle switching device 111.

The control device 151 is further characterized in that, owing to the temporal resolution of the control device, $\Delta t$, both the turn ON and turn OFF times of the controllable switching device are constrained to be integral multiples of $\Delta t$. Because control device 151 is not a fixed-frequency control device, it must input ON times and OFF times in order to turn ON and turn OFF switching device 111.

The duty cycle control mechanism is comprised of a target duty cycle estimator/output voltage error estimator 231, a mechanism for estimating, from output voltage error signals or input voltage signals or a combination of both, the target duty cycle, DT, and the uncorrupted output voltage error, VE; a variable-frequency duty cycle quantizer 221 for determining, for a target duty cycle estimate, a first set of at least one quantized duty cycle (DQj j=1, 2, . . . J) in the neighborhood of the target duty cycle DT, and otherwise suited for controlling switching device 111; and an output-voltage-error-driven duty cycle selector 211, for determining the turn ON and turn OFF times of switching device 111 by generating, from the first set of duty cycles DQj, a second set of at least two quantized duty cycles (DQk k=1, 2, . . . K, ordered from lowest to highest), and choosing, cycle by cycle, a duty cycle (and its corresponding ON time/OFF time pair) from the second set of duty cycles DQk, choosing in such a manner that the amplitude of the output voltage error is continually minimized.

In a digital implementation, the target duty cycle estimator 231 frequently takes the form of a digital PID (proportional-integral-differential) filter, operating on an output voltage error signal. According to the present invention, the filter may operate on an input voltage signal in lieu of or in addition to the output voltage error signal. Similarly, the output voltage error estimator 231 is frequently implemented as a PID filter. PID filters provide the possibility of trading off delay for improved signal-to-noise ratio. Where delay must be minimized, even at the price of a limited reliability output voltage error estimate, a bi-valued or tri-valued output voltage error estimate derived via binary or ternary comparators is simple and effective. Such is the nature of output voltage error estimator 231. Furthermore, in duty cycle control mechanism 201, the output-voltage-error-driven duty cycle selector 211 chooses the duty cycle based on samples of the output voltage error estimate taken during the ON time or the OFF time or both.

In the case that duty cycle selector 211 chooses the duty cycle based on samples of the output voltage error estimate taken during the ON time, the estimate of the output voltage error is sampled by duty cycle selector 211 after the switching cycle has begun but before the choice of duty cycle has been determined, and applied (by duty cycle selector 211) in time to effect the turn OFF implicit in the chosen duty cycle. For a buck converter, where the output voltage error excursions are symmetric with respect to the mean, the output voltage error estimate may be derived straightforwardly by sampling a binary or ternary comparator. The ideal error sampling time may be determined from the ON times of DQ1 and DQK; specifically, the sampling time relative to the start of the switching cycle is $\frac{1}{4}$(ON1+ONK), rounded down (if necessary) to the nearest multiple of $\Delta t$. The computation of the sampling time must be done as often as set DQj changes.

For a boost converter, where the output voltage error excursions are not symmetric with respect to the mean, the derivation of an output voltage error estimate is not as straightforward. In this case, a bi-valued or tri-valued output voltage error estimate is most easily constructed from two bi-valued samples of the error voltage, separated in time but specified such that in the steady state, one sample would normally be positive and the other negative. For example, the first sample could be taken $\frac{1}{4}$(OFF1+OFFK) after the turn OFF time (prior to the start of a switching cycle), and the second sample $\frac{1}{4}$(ON1+ONK) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is zero in the case of a tri-valued estimate, or unchanged from the previous value in the case of a bi-valued estimate.

In the case that duty cycle selector 211 chooses the duty cycle based on samples of the output voltage error estimate taken during the ON time AND AGAIN during the OFF time, the estimate of the output voltage error is sampled by duty cycle selector 211 ONCE after the switching cycle has begun but before the turn OFF time has been determined, and sampled AGAIN after the turn OFF time but before the final determination of duty cycle, and its implied turn ON time. The duty cycle selector 211 applies the first sample to limit the choice of duty cycles, and in so doing determines the turn OFF time; and applies the second sample to choose, finally, the duty cycle, and in so doing determines the turn ON time, marking the end of the switching cycle. Both choices are made immediately on sampling, in time to effect the turn OFF and the turn ON implicit in the chosen duty cycle. The ideal sampling times may be determined from the ON and OFF times of DQ1 and DQK. The first sampling time, relative to the start of the switching cycle, is $\frac{1}{4}$(ON1+ONK) rounded down (if necessary) to the nearest multiple of $\Delta t$; the second sampling time, relative to the turn OFF time, is $\frac{1}{4}$(OFF1+OFFK) rounded down (if necessary) to the nearest multiple of $\Delta t$. The computation of the sampling times must be done as often as set DQj changes.

Accordingly, the duty cycle selector 211 chooses, cycle by cycle, a duty cycle from the set DQk (and its corresponding ON time/OFF time pair); choosing DQ1 when the aggregate output voltage error estimate is highest, DQK when the aggregate output voltage error estimate is lowest, and one of the remaining intermediate duty cycles when the aggregate output voltage error is one of the corresponding intermediate values.

The determination of the set DQj for a given value of DT, is accomplished by the variable-frequency duty cycle quantizer 221 via a two-step process, the first step being the enumeration of quantized duty cycles in the neighborhood of DT, and the second step being the selection of DQj from the enumerated possibilities. The systematic enumeration of quantized duty cycles is accomplished by generating a set of quantized ON time/OFF time pairs characterized in that the quantized ON and OFF times of each pair (in the set) are determined independently of each other; that is, the sum of the ON time and OFF time is not fixed; and may vary, pair to pair, constrained to a set of discrete values {Tswi} (i=1, 2, . . . I) where Tswi is an integral multiple of $\Delta t$. This set of quantized pairs is trivially transformed into a set of quantized duty cycles. More switching cycle possibilities translates to more duty cycle possibilities, making it possible to select duty cycles DQj closer to DT, a critical factor in the minimization of quantization-induced output voltage ripple. The set DQj is chosen from the enumerated possibilities on the basis of proximity to DT. If J=1, then DQ1 (or DQ) is chosen as the duty cycle closest to but less than DT. If J=2, then DQ1 and DQ2 are chosen as the duty cycles that most closely bracket DT. If J=3, the set DQj will consist of the three duty cycles which collectively bracket DT and are closest to DT.

The determination of the second set of duty cycles DQk from the first set DQj, is accomplished by the duty cycle selector 211 via a two-step process, the first step being the extension of the set DQj, and the second step being the selection of DQk from the extension of set DQj. The extension of the set DQj, to XDQj (j=1, 2, . . . JJ), provides a comprehensive set of quantized duty cycles from which an effective working set DQk can be selected. The extension can be accomplished in a variety of ways. A very simple extension could be performed by setting XDQj=(m+(j−2))/n where DQ1=m/n. To provide finer resolution, XDQj could be set as follows:

|     | | |
| --- | --- | --- |
|     | XDQj = (m + (j − 3)/2)/n | if j is odd |
| and | XDQj = (m + (j − 4)/2)/(n − 1) | if j is even, |
| or  | XDQj = (m + (j − 3)/2)/n | if j is odd |
| and | XDQj = (m + (j − 2)/2)(n + 1) | if j is even. |

JJ, the number of elements of set XDQj, should be large enough so that the largest duty cycle in the set is large enough to compensate for the effects of parasitics at high load. The computation of XDQj must be done as often as DQj changes.

The working set of duty cycles, DQk, may be determined statically or dynamically; that is to say DQk may be a prescribed subset of XDQj, or it may be dynamically "mapped" to a generally contiguous subset of XDQj, determined by the load. The number of elements in this subset, K, is in either case determined by the logic of the duty cycle selector. In the case that duty cycle selector 211 chooses the duty cycle based on binary or ternary samples of the output voltage error estimate taken during the ON time or the OFF time, the number of elements, K, is 2 or 3; in the case that duty cycle selector 211 chooses the duty cycle based on binary or ternary samples of the output voltage error estimate taken during both the ON time and the OFF time, the number of elements, K, ranges from 4 to 9. In case K=2, the prescribed subset of XDQj, namely XDQ1 and XDQJJ, may generate intolerable output voltage ripple. This could be an artifact of the effect of parasitics, necessitating a significantly higher duty cycle at high load than at low load. To compensate, a mechanism for dynamically determining DQk is useful.

A simple but effective mechanism to dynamically determine a working set of duty cycles in the case that K=2 is to count the number of consecutive DQ1's or DQ2's, and when it exceeds a prescribed threshold, adjust DQ1 and DQ2 up or down by "sliding" or repositioning DQk within XDQj. Alternatively, a count of the excess of DQ1's over DQ2's or of DQ2's over DQ1's, in a window, could be used to adjust DQ1 and DQ2. Both of these mechanisms could be adapted for other values of K.

The application of variable-frequency duty cycle quantization, same-cycle output voltage feedback, and dynamic determination of the working set of duty cycles to compensate for the load-dependent effects of parasitics significantly improve static and dynamic performance, at minimal computational cost. While the duty cycle control mechanism described above has implicit performance limitations similar in nature to those of prior art duty cycle control mechanisms, the effects of duty cycle quantization on performance are substantially reduced, without introducing application dependencies.

Figure 3:
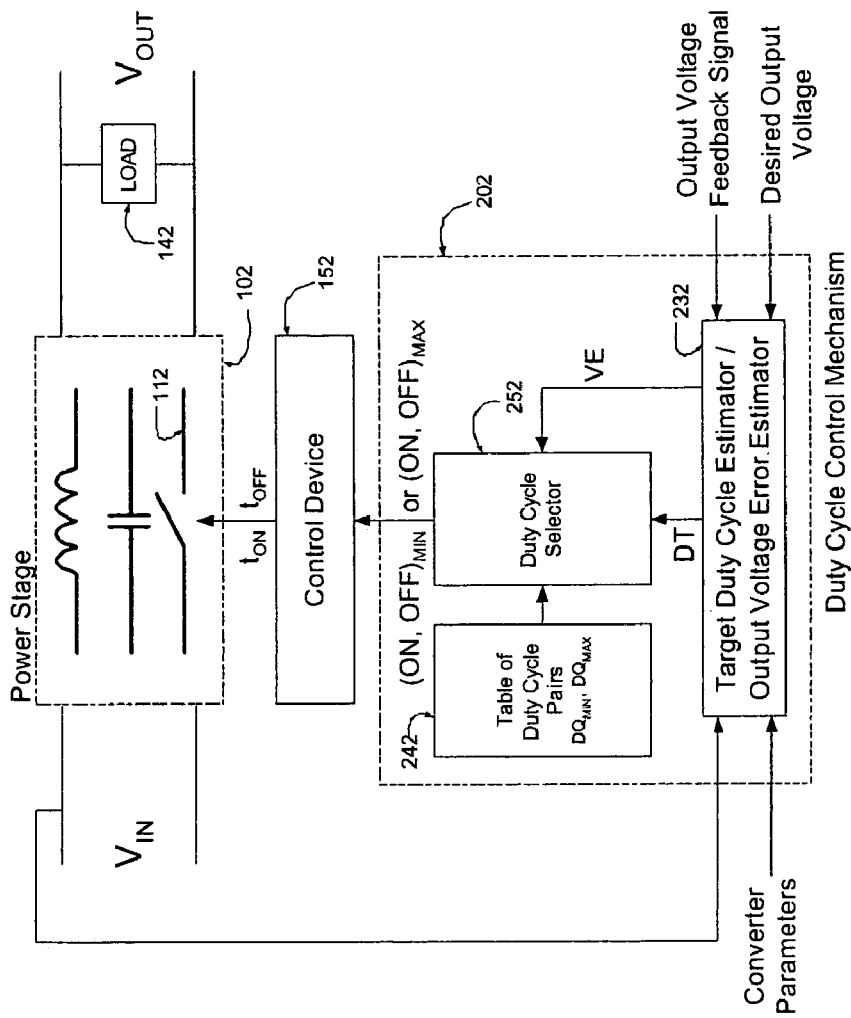
FIG. 3 is a block diagram illustrating one embodiment of a digital duty cycle control mechanism according to the present invention.

FIG. 3 describes a switched-mode DC/DC power converter according to the present invention, comprising power stage 102 for the purpose of converting input voltage Vin to output voltage Vout; control device 152 for the purpose of turning ON and turning OFF the controllable switching device 112, included in power stage 102; and duty cycle control mechanism 202 for controlling the duty cycle of switching device 112.

The control device 152 is further characterized in that, owing to the temporal resolution of the control device, $\Delta t$, both the turn ON and turn OFF times of the controllable switching device are constrained to be integral multiples of $\Delta t$. Because control device 152 is not a fixed-frequency control device, it must input ON times and OFF times in order to turn ON and turn OFF switching device 112.

The duty cycle control mechanism is comprised of a target duty cycle estimator/output voltage error estimator 232, a mechanism for estimating, from an output voltage error signal or an input voltage signal or a combination of both, the target duty cycle, DT, and the uncorrupted output voltage error, VE; and an output-voltage-error-driven duty cycle selector 252, for determining the turn ON and turn OFF times of switching device 112 by choosing, cycle by cycle, a quantized duty cycle (and its corresponding quantized ON time/OFF time pair) from a pair of quantized duty cycles (DQmin and DQmax bracketing DT), extracted from a table of duty cycle pairs 242, indexed by the estimated target duty cycle, DT; choosing in such a manner that the amplitude of the output voltage error is continually minimized.

In a digital implementation, the target duty cycle estimator 232 frequently takes the form of a digital PID (proportional-integral-differential) filter, operating on an output voltage error signal. According to the present invention, the filter may operate on an input voltage signal in lieu of or in addition to the output voltage error signal. Similarly, the output voltage error estimator 232 is frequently implemented as a PID filter. PID filters provide the possibility of trading off delay for improved signal-to-noise ratio. Where delay must be minimized, a bi-valued output voltage error estimate derived via a binary comparator is simple and effective. Such is the nature of output voltage error estimator 232.

Furthermore, in duty cycle control mechanism 202, the output voltage error is sampled by duty cycle selector 252 after the switching cycle has begun but before the choice of duty cycle has been determined, and applied (by duty cycle selector 252) in time to effect the turn OFF implicit in the chosen duty cycle.

For a buck converter, where the output voltage error excursions are symmetric with respect to the mean, the output voltage error estimate may be derived straightforwardly by sampling a binary comparator. The ideal error sampling time may be determined from the ON times of DQmin and DQmax; specifically, the sampling time relative to the start of the switching cycle is ¼(ONmin+ONmax), rounded down (if necessary) to the nearest multiple of $\Delta t$. The computation of the sampling time must be done as often as DT changes; but could be avoided entirely by incorporating the sampling time into table 242.

For a boost converter, where the output voltage error excursions are not symmetric with respect to the mean, the derivation of an output voltage error estimate is not as straightforward. In this case, a bi-valued output voltage error estimate is most easily constructed from two bi-valued samples of the error voltage, separated in time but specified such that in the steady state, one sample would normally be positive and the other negative. For example, the first sample could be taken ¼(OFFmin+OFFmax) after the turn OFF time (prior to the start of a switching cycle), and the second sample ¼(ONmin+ONmax) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is unchanged from the previous value.

Whether buck or boost, the duty cycle selector 252 chooses, cycle by cycle, DQmin or DQmax (and its corresponding ON time/OFF time pair), DQmin and DQmax having been extracted from table 242, indexed by DT; choosing DQmin when the output voltage error estimate is positive (i.e., the uncorrupted output voltage is higher than the desired output voltage), and DQmax when the output voltage error estimate is negative.

The content and construction of the table of duty cycle pairs 242 is described in FIG. 6. The determination of DQmin and DQmax for a given value of DT is a two-step process, the first step being the enumeration of quantized duty cycles in the neighborhood of DT, and the second step being the selection of DQmin and DQmax from the enumerated possibilities. The systematic enumeration of quantized duty cycles is accomplished by generating a set of quantized ON time/OFF time pairs characterized in that the quantized ON and OFF times of each pair (in the set) are determined independently of each other; that is, the sum of the ON time and OFF time is not fixed; and may vary, pair to pair, constrained to a set of discrete values {Tswi} (i=1, 2, . . . I) where Tswi is an integral multiple of $\Delta t$. This set of quantized pairs is trivially transformed into a set of quantized duty cycles. More switching cycle possibilities translates to more duty cycle possibilities, making it easier to select duty cycles close astride DT, a critical factor in the minimization of quantization-induced output voltage ripple.

One method of choosing DQmin and DQmax is to search the space of quantized duty cycles in the neighborhood of DT and choose the closest on either side of DT. Experience has taught that these choices may be problematic (with respect to output voltage ripple) when one of the chosen duty cycles is close to DT and the other, relatively far away. In that case, it is preferable to reject the closer in favor of the second (or third) closest duty cycle on the on the same "side" of DT as the rejected duty cycle. Once DQmin and DQmax are determined, the associated ON time/OFF time pairs, designated (ON, OFF)min and (ON, OFF)max, are derived trivially.

To estimate the size of table 242, consider the example of a duty cycle control mechanism with a 20 MHz clock, controlling a power stage with a nominal switching frequency of 1.25 MHz (16 clocks per nominal switching cycle), where switching cycles are allowed to vary ±one clock period from nominal. If the ON and OFF times associated with DQmax were encoded relative to the ON and OFF times associated with DQmin, the resulting table could be organized as 12×128.

The simplicity of the duty cycle control mechanism described above is appealing. The computational advantages of having a table of duty cycle pairs available, comes at the cost of a modest amount of infrequently-accessed memory. But the combination of variable-frequency duty cycle quantization and same-cycle output voltage feedback significantly improves static and dynamic performance. While the duty cycle control mechanism described above has implicit performance limitations similar in nature to those of prior art duty cycle control mechanisms, the effects of duty cycle quantization on performance are substantially reduced, without introducing application dependencies.

Figure 4:
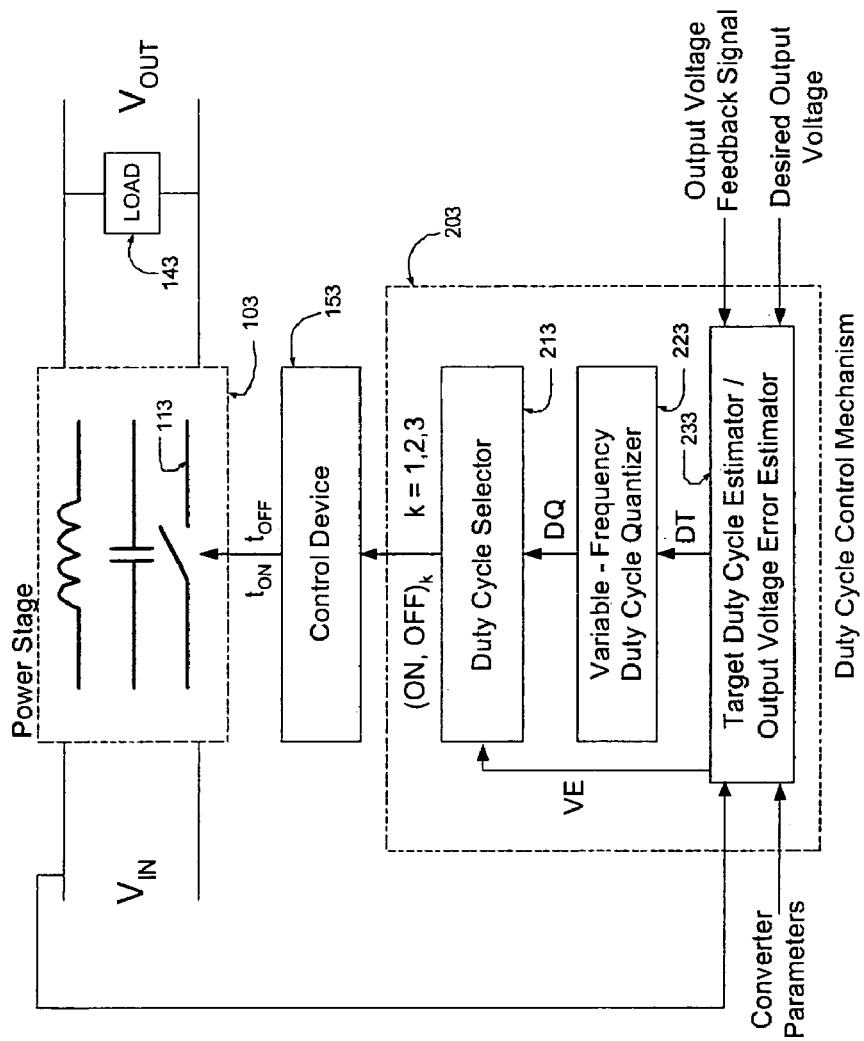
FIG. 4 is a block diagram illustrating a second embodiment of a digital duty cycle control mechanism according to the present invention.

FIG. 4 describes a switched-mode DC/DC power converter according to the present invention, comprising power stage 103 for the purpose of converting input voltage Vin to output voltage Vout; control device 153 for the purpose of turning ON and turning OFF the controllable switching device 113, included in power stage 103; and duty cycle control mechanism 203 for controlling the duty cycle of switching device 113.

The control device 153 is further characterized in that, owing to the temporal resolution of the control device, $\Delta t$, both the turn ON and turn OFF times of the controllable switching device are constrained to be integral multiples of $\Delta t$. Because control device 153 is not a fixed-frequency control device, it must input ON times and OFF times in order to turn ON and turn OFF switching device 113.

The duty cycle control mechanism is comprised of a target duty cycle estimator/output voltage error estimator 233, a mechanism for estimating, from an output voltage error signal or an input voltage signal or a combination of both, the target duty cycle, DT, and the uncorrupted output voltage error, VE; a variable-frequency duty cycle quantizer 223 for determining the quantized duty cycle DQ closest to the target duty cycle estimate, DT; and an output-voltage-error-driven duty cycle selector 213, a mechanism for determining the turn ON and turn OFF times of switching device 113 by generating, for each value of DQ, a set of three quantized duty cycles (DQmin, DQ, and DQmax, ordered from lowest to highest) and by choosing, cycle by cycle, DQmin or DQ or DQmax (and its corresponding ON time/OFF time pair), choosing in such a manner that amplitude of the output voltage error is continually minimized.

In a digital implementation, the target duty cycle estimator 233 frequently takes the form of a digital PID (proportional-integral-differential) filter, operating on an output voltage error signal. According to the present invention, the filter may operate on an input voltage signal in lieu of or in addition to the output voltage error signal. Similarly, the output voltage error estimator 233 is frequently implemented as a PID filter. PID filters provide the possibility of trading off delay for improved signal-to-noise ratio. Where delay must be minimized, and dynamic response is important, a tri-valued output voltage error estimate derived via a ternary comparator (a binary comparator with a dead zone) is simple and effective. Such is the nature of output voltage error estimator 233. Furthermore, in duty cycle control mechanism 203, the estimate of the output voltage error is sampled by duty cycle selector 213 after the switching cycle has begun but before the choice of duty cycle has been determined, and applied (by duty cycle selector 213) in time to effect the turn OFF implicit in the chosen duty cycle.

For a buck converter, where the output voltage error excursions are symmetric with respect to the mean, the output voltage error estimate may be derived straightforwardly by sampling a ternary comparator. The ideal sampling time may be determined from the ON times of DQmin and DQmax; specifically, the sampling time relative to the start of the switching cycle is ¼(ONmin+ONmax), rounded down (if necessary) to the nearest multiple of $\Delta t$. The computation of the sampling time must be done as often as DQ changes.

(It is noted here that the tri-valued output voltage error estimate could also be constructed from two bi-valued error samples separated in time but specified such that in the steady state, one sample would normally be positive and the other negative.)

For a boost converter, where the output voltage error excursions are not symmetric with respect to the mean, the derivation of an output voltage error estimate is not as straightforward. In this case, a tri-valued output voltage error estimate is most easily constructed from two bi-valued samples of the error voltage, separated in time but specified such that in the steady state, one sample would normally be positive and the other negative. For example, the first sample could be taken ¼(OFFmin+OFFmax) after the turn OFF time (prior to the start of a switching cycle), and the second sample ¼(ONmin+ONmax) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is zero (neither positive nor negative).

Whether buck or boost, the duty cycle selector 213 chooses, cycle by cycle, DQmin or DQ or DQmax (and its corresponding ON time/OFF time pair); choosing DQmin when the output voltage error estimate is positive (i.e., the uncorrupted output voltage is higher than the desired output voltage), DQmax when the output voltage error estimate is negative, and DQ when the output voltage error estimate is zero (neither positive nor negative).

The determination of DQ for a given value of DT, is accomplished by the variable-frequency duty cycle quantizer 223 via a two-step process, the first step being the enumeration of quantized duty cycles in the neighborhood of DT, and the second step being the selection of DQ from the enumerated possibilities. The systematic enumeration of quantized duty cycles is accomplished by generating a set of quantized ON time/OFF time pairs characterized in that the quantized ON and OFF times of each pair (in the set) are determined independently of each other; that is, the sum of the ON time and OFF time is not fixed; and may vary, pair to pair, constrained to a set of discrete values {Tswi} (i=1, 2, . . . I) where Tswi is an integral multiple of $\Delta t$. This set of quantized pairs is trivially transformed into a set of quantized duty cycles. More switching cycle possibilities translates to more duty cycle possibilities, making it possible to select a duty cycle closer to DT, a critical factor in the minimization of quantization-induced output voltage ripple. DQ is chosen as the duty cycle closest to but less than DT, and its associated ON time/OFF time pair is derived trivially.

The determination of DQmin and DQmax is accomplished by the duty cycle selector 213. While a number of options are available, a simple, and cost effective option is to

| set: | and: |
|---|---|
| ONmin = ONq − 1 × $\Delta t$ | OFFmin = OFFq + 1 × $\Delta t$ |
| ONq = ONq | OFFq = OFFq |
| ONmax = ONq + 1 × $\Delta t$ | OFFmax = OFFq − 1 × $\Delta t$ |

As indicated above, the tri-valued output voltage error estimate determines the ON time, adjusting ONq by −1, 0, or +1 clocks. The OFF time is determined implicitly by adjusting OFFq in the opposite direction. These values allow the converter to respond effectively to changes in line and load conditions, at the cost of modest output voltage ripple.

A second simple and cost effective option is to

| set: | and: |
|---|---|
| ONmin = ONq − 1 × $\Delta t$ | OFFmin = OFFq |
| ONq = ONq | OFFq = OFFq |
| ONmax = ONq | OFFmax = OFFq − 1 × $\Delta t$ |

As indicated above, the tri-valued output voltage error estimate determines the ON time, adjusting ONq by −1, 0, or 0 clocks. The OFF time is determined by adjusting OFFq by 0, 0, or −1. These values allow the converter to reduce output voltage ripple at the cost of increasing the sensitivity to changes in line and load conditions.

The simplicity of the duty cycle control mechanism described above is appealing. Moreover, the application of same-cycle, tri-valued output voltage feedback significantly improves static and dynamic performance. While the duty cycle control mechanism described above has implicit performance limitations similar in nature to those of prior art duty cycle control mechanisms, the effects of duty cycle quantization on performance are substantially reduced, without introducing application dependencies.

Figure 5:
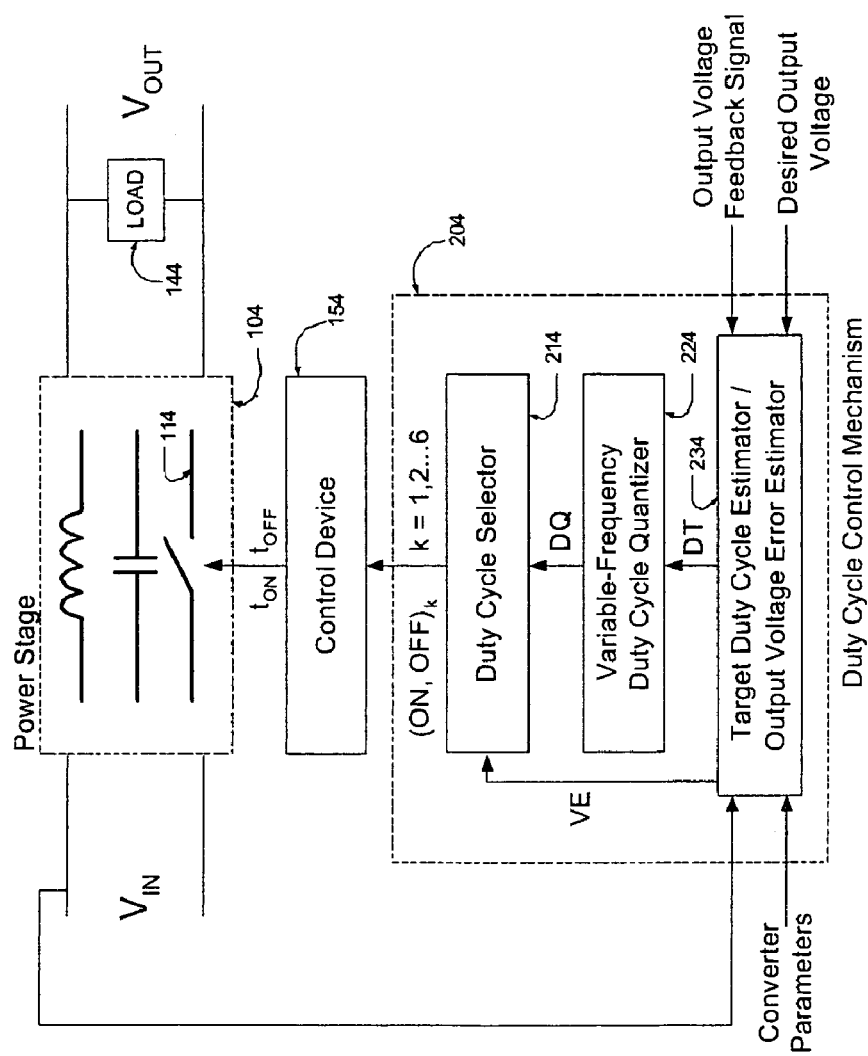
FIG. 5 is a block diagram illustrating a third embodiment of a digital duty cycle control mechanism according to the present invention.

FIG. 5 describes a switched-mode DC/DC power converter according to the present invention, comprising power stage 104 for the purpose of converting input voltage Vin to output voltage Vout; control device 154 for the purpose of turning ON and turning OFF the controllable switching device 114, included in power stage 104; and duty cycle control mechanism 204 for controlling the duty cycle of switching device 114.

The control device 154 is further characterized in that, owing to the temporal resolution of the control device, $\Delta t$, both the turn ON and turn OFF times of the controllable switching device are constrained to be integral multiples of $\Delta t$. Because control device 154 is not a fixed-frequency control device, it must input ON times and OFF times in order to turn ON and turn OFF switching device 114.

The duty cycle control mechanism is comprised of a target duty cycle estimator/output voltage error estimator 234, a mechanism for estimating, from an output voltage error signal or an input voltage signal or a combination of both, the target duty cycle, DT, and the uncorrupted output voltage error, VE; a variable-frequency duty cycle quantizer 224 for determining the quantized duty cycle DQ closest to the target duty cycle estimate, DT; and an output-voltage-error-driven duty cycle selector 214, a mechanism for determining the turn ON and turn OFF times of switching device 114 by generating, for each value of DQ, a set of six quantized duty cycles (DQmin, DQmn, DQn, DQx, DQmx, and DQmax, ordered from lowest to highest) and by choosing, cycle by cycle, DQmin or DQmn or DQn or DQx or DQmx or DQmax (and its corresponding ON time/OFF time pair), choosing in such a manner that amplitude of the output voltage error is continually minimized.

In a digital implementation, the target duty cycle estimator 234 frequently takes the form of a digital PID (proportional-integral-differential) filter, operating on an output voltage error signal. According to the present invention, the filter may operate on an input voltage signal in lieu of or in addition to the output voltage error signal. Similarly, the output voltage error estimator 234 is frequently implemented as a PID filter. PID filters provide the possibility of trading off delay for improved signal-to-noise ratio. Where delay must be minimized, and both static and dynamic response are important, a more precise output voltage error estimate, derived from multiple samples, may be appropriate. Such is the nature of output voltage error estimator 234. Furthermore, in duty cycle control mechanism 204, the estimate of the output voltage error is sampled by duty cycle selector 214 ONCE, via a ternary comparator, after the switching cycle has begun but before the turn OFF time has been determined, and sampled AGAIN, via a binary comparator, after the turn OFF time but before the final determination of duty cycle, and its implied turn ON time. The duty cycle selector 214 applies the first sample to limit the choice of duty cycles, and in so doing determines the turn OFF time; and applies the second sample to choose, finally, the duty cycle, and in so doing determines the turn ON time, marking the end of the switching cycle. Both choices are made immediately on sampling, in time to effect the turn OFF and the turn ON implicit in the chosen duty cycle.

For a buck converter, where the output voltage error excursions are symmetric with respect to the mean, the output voltage error estimate may be derived straightforwardly by sampling a ternary comparator. The ideal sampling times are determined from the ON and OFF times of DQmin and DQmax. The first sampling time, relative to the start of the switching cycle, is ½(ONmin+ONmax) rounded down (if necessary) to the nearest multiple of $\Delta t$; the second sampling time, relative to the turn OFF time, is ½(OFFmin+OFFmax) rounded down (if necessary) to the nearest multiple of $\Delta t$. The computation of the sampling times must be done as often as DQ changes.

(It is noted here that the tri-valued output voltage error estimate could also be constructed from two bi-valued samples separated in time but specified such that in the steady state, one sample would normally be positive and the other negative. Further, it is noted that in the event two bi-valued samples were used to obtain a tri-valued output voltage error estimate, the tri-valued estimate could be scheduled during switch ON when DT>0.5 and during switch OFF when DT<0.5. In this case the bi-valued estimate would be scheduled during switch ON when DT<0.5 and during switch OFF when DT>0.5.)

For a boost converter, where the output voltage error excursions are not symmetric with respect to the mean, the derivation of an output voltage error estimate is not as straightforward. In this case, a tri-valued output voltage error estimate is most easily constructed from two bi-valued samples of the error voltage, separated in time but specified such that in the steady state, one sample would normally be positive and the other negative. For example, the first sample could be taken ¼(OFFmin+OFFmax) after the turn OFF time (prior to the start of a switching cycle), and the second sample ¼(ONmin+ONmax) after the succeeding turn ON time (marking the start of a switching cycle), enabling an output voltage error estimate to be constructed and a duty cycle chosen in time to effect the turn OFF implicit in the chosen duty cycle. If both of these samples are positive, the error estimate is positive; if both samples are negative, the error estimate is negative. If one sample is positive and the other negative, the error estimate is zero (neither positive nor negative).

Accordingly, the duty cycle selector 214 chooses, cycle by cycle, DQmin, DQmn, DQn, DQx, DQmx, or DQmax (and its corresponding ON time/OFF time pair); choosing DQmin when the aggregate output voltage error estimate is highest, DQmax when the aggregate output voltage error estimate is lowest, and one of the remaining intermediate duty cycles when the aggregate output voltage error is one of the corresponding intermediate values.

The determination of DQ for a given value of DT, is accomplished by the variable-frequency duty cycle quantizer 223 via a two-step process, the first step being the enumeration of quantized duty cycles in the neighborhood of DT, and the second step being the selection of DQ from the enumerated possibilities. The systematic enumeration of quantized duty cycles is accomplished by generating a set of quantized ON time/OFF time pairs characterized in that the quantized ON and OFF times of each pair (in the set) are determined independently of each other; that is, the sum of the ON time and OFF time is not fixed; and may vary, pair to pair, constrained to a set of discrete values {Tswi} (i=1, 2, . . . I) where Tswi is an integral multiple of $\Delta t$. This set of quantized pairs is trivially transformed into a set of quantized duty cycles. More switching cycle possibilities translates to more duty cycle possibilities, making it possible to select a duty cycle closer to DT, a critical factor in the minimization of quantization-induced output voltage ripple. DQ is chosen as the duty cycle closest to but less than DT, and its associated ON time/OFF time pair is derived trivially.

The determination of DQmin thru DQmax is accomplished by the duty cycle selector 213. While a number of options are available, a simple, and cost effective option is to

| set: | and: |
|---|---|
| ONmin = ONq − 1 × $\Delta t$ | OFFmin = OFFq + 2 × $\Delta t$ |
| ONmn = ONq − 1 × $\Delta t$ | OFFmn = OFFq |
| ONn = ONq | OFFn = OFFq + 1 × $\Delta t$ |
| ONx = ONq | OFFx = OFFq − 1 × $\Delta t$ |
| ONmx = ONq + 1 × $\Delta t$ | OFFmx = OFFq |
| ONmax = ONq + 1 × $\Delta t$ | OFFmax = OFFq − 2 × $\Delta t$ |

As indicated above, the tri-valued output voltage error estimate determines the ON time, adjusting ONq by −1, 0, or +1 clocks. The second, bi-valued estimate determines the OFF time, adjusting OFFq by +2, +1, 0, −1, or −2 clocks, depending on the values of both estimates. These values allow the converter to respond effectively to changes in line and load conditions, and limit output voltage ripple in the steady state.

The simplicity of the duty cycle control mechanism described above is appealing. Moreover, the application of twice-in-the-same-cycle output voltage feedback further improves static and dynamic performance. While the duty cycle control mechanism described above has implicit performance limitations similar in nature to those of prior art duty cycle control mechanisms, the effects of duty cycle quantization on performance are substantially reduced, without introducing application dependencies.

While the foregoing duty cycle control mechanisms (implementing the PWM paradigm) are capable of providing effective output voltage regulation while the power converter is operating in continuous conduction mode, provision for efficient operation at light load often requires the addition of a low-power or power-saving control mechanism for regulating output voltage when the power converter transitions to discontinuous conduction mode. Mechanisms for regulating in discontinuous conduction mode (DCM) generally implement the pulse frequency modulation (PFM) paradigm, wherein the controllable switch is turned ON, for a fixed period, whenever the output voltage error estimate drops below a prescribed threshold value. In this case, it is necessary to devise a mechanism to detect the transition into and out of DCM, and effect a smooth transition from one duty cycle control mechanism to the other. Such a mechanism must handle abrupt as well as gradual changes in load.

The abrupt resumption of load (from a low-load state) presents the more serious challenge to designers of power supply regulators. In the case of a buck converter, for example, the slam is typically detected when the (slam-induced) droop in the output voltage triggers a threshold detection mechanism, perhaps the very mechanism used to turn ON the switch in PFM mode. The transition from PFM to PWM may then be accomplished straightforwardly, by holding the switch ON until the energy stored in the converter is sufficient to supply the new load at the desired output voltage (via the PWM duty cycle control mechanism).

In the case of a boost converter, however, the recovery from a slam is a bit more complicated, owing to the flyback nature of the boost topology. The switch cannot be held ON until the energy stored in the capacitor is sufficient to supply the new load, but must be cycled. One approach to effecting the transition from PFM to PWM in this case is to switch to PWM immediately on detection of a slam, with a sequence of duty cycles converging (from above) to the working set of duty cycles, DQk, generated by the PWM duty cycle control mechanism.

I claim:

1. A switched-mode DC/DC converter producing at least one output voltage (Vout), comprising:

At least one power stage (PS) for the purpose of converting an input voltage (Vin) into an output voltage (Vout), each power stage including at least one controllable switching device (CS); and A control device (CD) for the purpose of turning ON and turning OFF said controllable switching device (CS), characterized in that Owing to the temporal resolution of the control device, $\Delta t$, both the turn ON and turn OFF times of the controllable switching device (CS) are constrained to be integral multiples of $\Delta t$; and A duty cycle control mechanism (DC) for controlling the duty cycle of said controllable switching device, comprising:

A mechanism for estimating output voltage error, the output voltage error being the difference between the uncorrupted output voltage and the desired output voltage (Vdo); and A mechanism for estimating the target duty cycle, the target duty cycle being the duty cycle essential to achieve the desired output voltage (Vdo); and A duty cycle quantization mechanism (DQ) for determining, for a target duty cycle estimate, a first set of at least one quantized ON time/OFF time pair suitable for controlling said controllable switching device, characterized in that the sum of the quantized ON time and OFF time of each pair (in said first set) is constrained to a set of discrete values $\{Tswi\}$ ($i=1, 2, \ldots I$) where I is a positive integer and Tswi is an integral multiple of $\Delta t$; and A selector mechanism (SM) for determining the turn ON and turn OFF times of said controllable switching device by choosing, cycle by cycle, an ON time/OFF time pair from a second set of at least two quantized ON time/OFF time pairs, derived from said first set and similarly constrained, choosing in such a manner that the amplitude of the output voltage error is continually minimized.

2. A method of converting an input voltage to an output voltage by means of a switched-mode DC/DC converter; the input voltage (Vin) being converted into an output voltage (Vout) with the aid of a power stage (PS), including at least one controllable switching device (CS), which is turned ON and turned OFF by a control device (CD) characterized in that Owing to the temporal resolution of the control device, $\Delta t$, both the turn ON and turn OFF times of the controllable switching device (CS) are constrained to be integral multiples of $\Delta t$; and A duty cycle control mechanism (DC) for controlling the duty cycle of said controllable switching device, comprising:

A mechanism for estimating output voltage error, the output voltage error being the difference between the uncorrupted output voltage and the desired output voltage (Vdo); and A mechanism for estimating the target duty cycle, the target duty cycle being the duty cycle essential to achieve the desired output voltage (Vdo); and A duty cycle quantization mechanism (DQ) for determining, for a target duty cycle estimate, a first set of at least one quantized ON time/OFF time pair suitable for controlling said controllable switching device, characterized in that the sum of the quantized ON time and OFF time of each pair (in said first set) is constrained to a set of discrete values $\{Tswi\}$ ($i=1, 2, \ldots I$) where I is a positive integer and Tswi is an integral multiple of $\Delta t$; and A selector mechanism (SM) for determining the turn ON and turn OFF times of said controllable switching device by choosing, cycle by cycle, an ON time/OFF time pair from a second set of at least two quantized ON time/OFF time pairs, derived from said first set and similarly constrained, choosing in such a manner that the amplitude of the output voltage error is continually minimized.

3. The method of claim 2, wherein the converter is a buck converter.

4. The method of claim 2, wherein the converter is a multi-phase buck converter.

5. The method of claim 2, wherein the converter is a boost converter.

6. The method of claim 2, wherein the converter is an inverting buck-boost converter.

7. The method of claim 2, wherein the converter is an up-down converter.

8. The method of claim 2, wherein the converter is a forward converter.

9. The method of claim 2, wherein the converter is a flyback converter.

10. The method of claim 2, wherein the converter is a multi-output converter, including at least two controllable switching devices.

11. The method of claim 2, wherein the mechanism for estimating the target duty cycle, utilizes an algorithm involving the input voltage (Vin).

12. The method of claim 2, wherein the mechanism for estimating the target duty cycle, utilizes an algorithm involving the output voltage (Vout).

13. The method of claim 2, wherein the duty cycle quantization mechanism (DQ) considers the difference between the estimated target duty cycle and the duty cycle implied by a prospective ON time/OFF time pair in determining whether or not to include said prospective ON time/OFF time pair in the first set of at least one quantized ON time/OFF time pair determined for said estimated target duty cycle.

14. The method of claim 2, wherein the duty cycle quantization mechanism (DQ) considers the difference between the estimated target duty cycle and the duty cycle implied by a prospective ON time/OFF time pair relative to the difference between the estimated target duty cycle and the duty cycle implied by each of the other prospective ON time/OFF time pairs in determining whether or not to include said prospective ON time/OFF time pair in the first set of at least one quantized ON time/OFF time pair determined for said estimated target duty cycle.

15. The method of claim 2, wherein the duty cycle quantization mechanism (DQ) determines, for a target duty cycle estimate, a first set of at least one quantized ON time/Off time pair by accessing a table (of sets) indexed by said target duty cycle estimate.

16. The method of claim 2, wherein the second set of at least two ON time/OFF time pairs is a set of exactly j pairs (j=1, 2, . . . J), ordered in terms of their implied duty cycle from Lowest to Highest; and Wherein the output voltage error estimate is j-valued and ordered from Highest to Lowest; and Wherein the selector mechanism (SM) chooses the ON time/OFF time pair with the Lowest implied duty cycle when the current output voltage error estimate is Highest, and the pair with the Highest implied duty cycle when the current output voltage error estimate is Lowest, and one of the remaining intermediate pairs when the current output voltage error is one of the corresponding intermediate values.

17. The method of claim 2, wherein the current output voltage error estimate is generated, and the ON time/OFF time pair from the second set of at least two quantized ON time/OFF time pairs is chosen, after the switching cycle has begun, but before the turn OFF time implicit in the chosen pair.

18. The method of claim 2, wherein the current output voltage error estimate is generated, and the ON time/OFF time pair from the second set of at least two quantized ON time/OFF time pairs is chosen, after the switching cycle has begun, and after the turn OFF time implicit in the chosen pair.

19. The method of claim 2, wherein the second set of at least two ON time/OFF time pairs is a set of exactly 2 pairs, ordered in terms of their implied duty cycle from Low to High; and Wherein the output voltage error estimate is bi-valued: High and Low; and Wherein the selector mechanism (SM) chooses the ON time/OFF time pair with the Low implied duty cycle when the current output voltage error estimate is High, and the pair with the High implied duty cycle when the current output voltage error estimate is Low.

20. The method of claim 19, wherein the current output voltage error estimate is generated, and the ON time/OFF time pair chosen, after the switching cycle has begun, but before the turn OFF time implicit in the chosen pair.

21. The method of claim 20, wherein the estimated output voltage error is the output of a binary comparator.

22. The method of claim 2, wherein the second set of at least two ON time/OFF time pairs is constrained, by the selector mechanism (SM), to prevent excessive Electromagnetic Interference (EMI).

23. The method of claim 22, wherein said constraint takes the form of a requirement that the longest of the switching cycles implied by said ON time/OFF time pairs differs from the shortest by at most $n \times \Delta t$ (n=1, 2, . . . N).

24. The method of claim 2, wherein some of the functionality of the mechanism for estimating the output voltage error is implemented in software on a microprocessor.

25. The method of claim 2, wherein some of the functionality of the mechanism for estimating the target duty cycle is implemented in software on a microprocessor.

26. The method of claim 2, wherein some of the functionality of the duty cycle quantization mechanism (DQ) is implemented in software on a microprocessor.

27. The method of claim 2, wherein some of the functionality of the selector mechanism (SM) is implemented in software on a microprocessor.

28. The method of claim 4, wherein the selector mechanism further operates to insure that the sequencing of each phase of the multi-phase buck converter is accomplished in accordance with standard multi-phase practice.

29. The method of claim 10, wherein the selector mechanism further operates to insure that the controllable switching devices are not switched ON simultaneously.

30. The method of claim 2, wherein the second set of at least two quantized ON time/OFF time pairs is adjusted dynamically to compensate for the load-dependent effects of parasitics.

31. The method of claim 30, wherein the mechanism employed to adjust the second set of at least two quantized ON time/OFF time pairs employs at least one counter and at least one comparator.

* * * * *